July 29, 1952         R. A. SCHAEFER ET AL         2,605,149
BEARING
Filed March 11, 1946
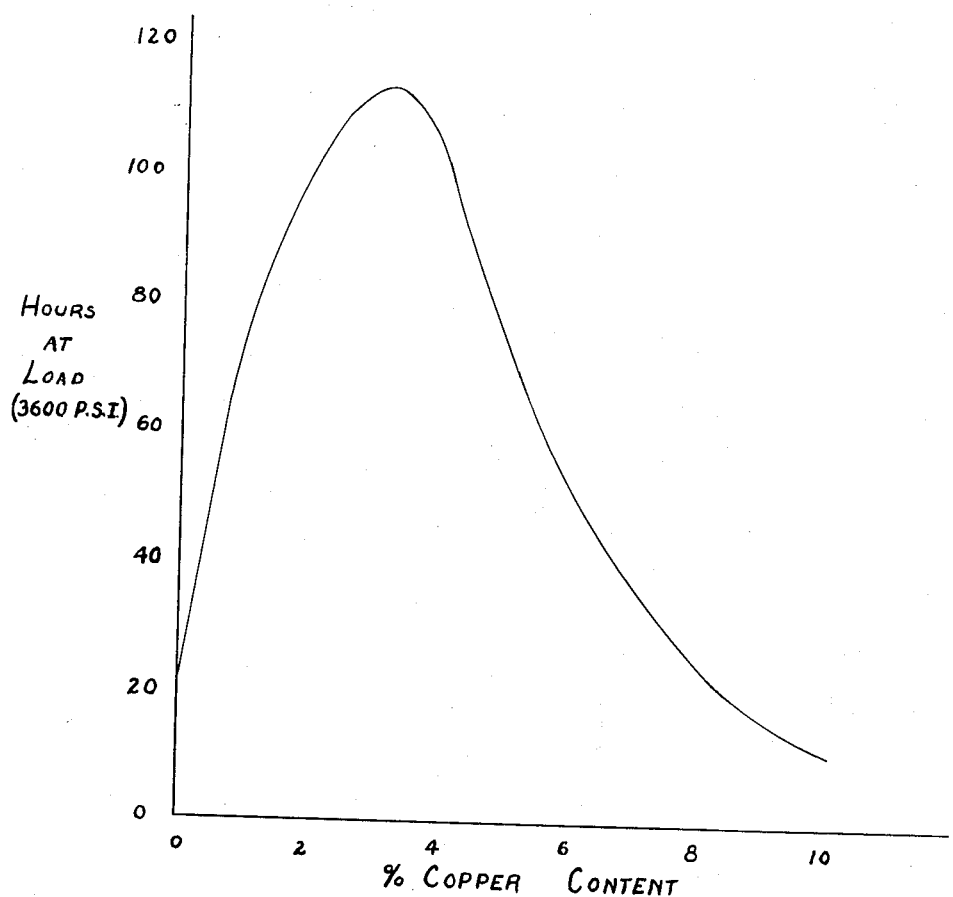
EFFECT OF COPPER CONTENT ON FATIGUE RESISTANCE OF Pb-Sn-Cu PLATED .004" THICK ON STEEL
FIG. 4
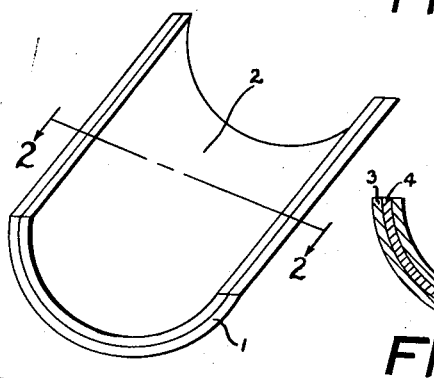
FIG. 1
FIG. 3
FIG. 2
INVENTORS.
RALPH A. SCHAEFER.
BY JAMES B. MOHLER.
Fay, Golrick & Fay.
Attorneys.

Patented July 29, 1952

2,605,149

UNITED STATES PATENT OFFICE 2,605,149

BEARING

Ralph A. Schaefer, Cleveland, and James B. Mohler, Euclid, Ohio, assignors to The Cleveland Graphite Bronze Company, Cleveland, Ohio, a corporation of Ohio Application March 11, 1946, Serial No. 653,464

1 Claim. (Cl. 308—237)

The present invention relates to an improved bearing having a surface layer of bearing metal of the lead base type. The main object of the invention is to provide a bearing of composite construction having a surface layer of an alloy which is high in fatigue resistance and which has good running qualities for internal combution engines and the like, in which the bearing is subjected to relatively high loads and high surface speeds. It is applicable in cases where a thin layer of bearing metal is desired upon which no machining is to be performed after it has been applied as well as for applications where a relatively thick layer of metal is applied and subsequently machined to finished size.

It is a well-established fact that composite bearing structures consisting of a supporting backing layer and a thin layer of a bearing alloy of approximately .001″ to .005″ thick are superior in fatigue resistance to bearing structures having relatively thick layers of the same bearing materials. It is more economical to electroplate these thin bearing materials so that no subsequent machining operations are required, than by any other known process for bonding different materials together. In the past, lead-tin and lead-indium alloys have been used extensively in numerous bearing applications by plating to size so that no subsequent machining was required and although their characteristics are very good for most bearing purposes, in heavy duty applications their fatigue resistance is not sufficient and these materials fail prematurely by developing fatigue cracks.

The present invention contemplates the use of an electrodeposited layer of an alloy of lead, tin and a third metal of either copper, antimony or arsenic, upon a base metal such as steel or upon a composite structure such as steel to which is bonded a layer of copper, copper-lead, silver or similar metals or alloys. The soft lead base materials are desirable bearing materials because they allow the absorption of foreign particles from the oil stream and adjustment for slight misalignment between the bearings and the journal without seizure of the bearing.

The ability of the softer bearing metals to absorb these foreign particles is known as embeddability. The present alloy has all the advantages of various lead base alloys plus increased fatigue resistance.

To the accomplishment of the foregoing and related ends, said invention, then, consists of the means hereinafter fully described and pointed out in the claims; the annexed drawings and the following description setting forth in detail certain structure embodying the invention, such disclosed means constituting, however, but one of various forms in which the principle of the invention may be used.

In said annexed drawings:

Fig. 1 is a perspective view of a bearing made according to the invention;

Fig. 2 is a section taken along the plane 2—2 of Fig. 1;

Fig. 3 is a cross-sectional view of another form of bearing structure embodying the invention; and Fig. 4 is a graph showing effect on fatigue strength of the copper content in an alloy of lead-tin and copper.

Referring to the drawings: in Fig. 1 is shown a view of a bearing consisting of a steel backing member 1 and a layer of electrodeposited lead-tin and copper, antimony or arsenic alloy 2. Fig. 3 shows a bearing composed of a steel backing member 3, an intermediate layer of metal such as a copper alloy or silver 4, and a surface layer 5 of lead-tin plus a third metal of the group of copper, antimony or arsenic. In Fig. 4 is illustrated a typical ternary alloy of lead-tin-copper showing the effect of various percentages of copper added to a lead-tin alloy of approximately 10% tin balance lead directly on steel. The graph represents the results of bearing tests in which the bearings were loaded at 3600 pounds per square inch and inspected at regular intervals, the test being considered complete when the bearing material exhibited visual fatigue cracks on the running surface. The bearings tested each consisted of a steel backing member upon which was electroplated a layer of bearing material finished to .004″ thickness. It is quite apparent from this graph that the fatigue strength of the alloy increases sharply with increased copper content up to approximately 3% after which it decreases very rapidly. For best results, we have chosen the range of copper between .5% to 6% as a practical range which gives the maximum fatigue life to the bearing alloy. Although the preferred composition of an alloy for the surface layer of the bearing consists of 6 to 12% tin, .5% to 6% copper and the balance lead, an especially good material and one which appears best for most purposes consists of about 3.0% copper, 10% tin and the balance lead. Tests performed on this material give maximum fatigue properties.

Electroplated layers of lead-tin alloys have been used to considerable advantage but there are, however, certain shortcomings in this material, namely, that it is not strong enough in fatigue for certain heavy duty applications. Laboratory tests show that an electroplated layer of lead, tin and copper or antimony or arsenic is superior to straight lead-tin and lead-indium.

When plated .001" thick on an intermediate layer of copper-lead, the lead-tin copper alloy withstood a load of 3600 pounds and 4200 R. P. M. for 300 hours, while lead-indium plated to .001" thickness on silver failed at 100 hours with a load of only 2200 pounds and 4200 R. P. M.

The metals in the above tests were electroplated as an alloy. The results of these tests show conclusively that the lead-tin-copper or antimony or arsenic alloy is superior to metals now in common use for thin surface layers for bearing purposes and it is also suitable where thicker layers are desired.

The steel shell or backing member for the bearing is prepared in the usual manner for plating, following the steps of degreasing, etching, etc., including silver strike on the shell to aid in the bonding of the alloy layer to the backing member. A typical composition of a lead-tin-copper alloy bath is as follows:

| | Grams per liter |
|---|---|
| Lead | 100 to 110 |
| Fluo boric acid | 40 to 50 |
| Total tin | 8 to 12 |
| Resorcinol | 1 to 5 |
| Gelatine | .1 minimum |
| Copper | 2 to 3 |

This bath will result in an electroplated layer of the following composition, 8-12% tin, depending on addition agent concentration, 2.0-3.0% copper, balance lead. The composition of plated metal can, of course, be changed by variation of the above bath.

Antimony or arsenic can be substituted for copper in the above bath and the resulting deposit will be 2.0 to 3.0% of either antimony or arsenic.

Other modes of applying the principle of the invention may be employed instead of the one explained, changes being made as regards the structure herein disclosed, provided the means stated by the following claim or the equivalent of such stated means be employed.

We, therefore, particularly point out and claim as our invention:

A bearing structure consisting of a supporting backing member and a surface layer of an electrodeposited alloy of approximately 10.0% tin, approximately 3% copper and the balance lead.

RALPH A. SCHAEFER.
JAMES B. MOHLER.

REFERENCES CITED

The following references are of record in the file of this patent:

UNITED STATES PATENTS

| Number | Name | Date |
|---|---|---|
| 2,198,240 | Boegehold | Apr. 23, 1940 |
| 2,316,119 | Bagley | Apr. 6, 1943 |

OTHER REFERENCES

Bearing Metals and Bearings, Corse, 1930, page 365.